United States Patent Office 3,538,279
Patented Nov. 3, 1970

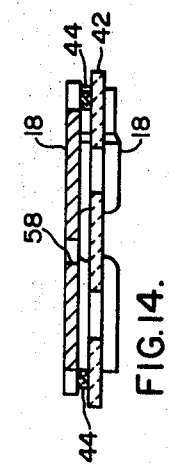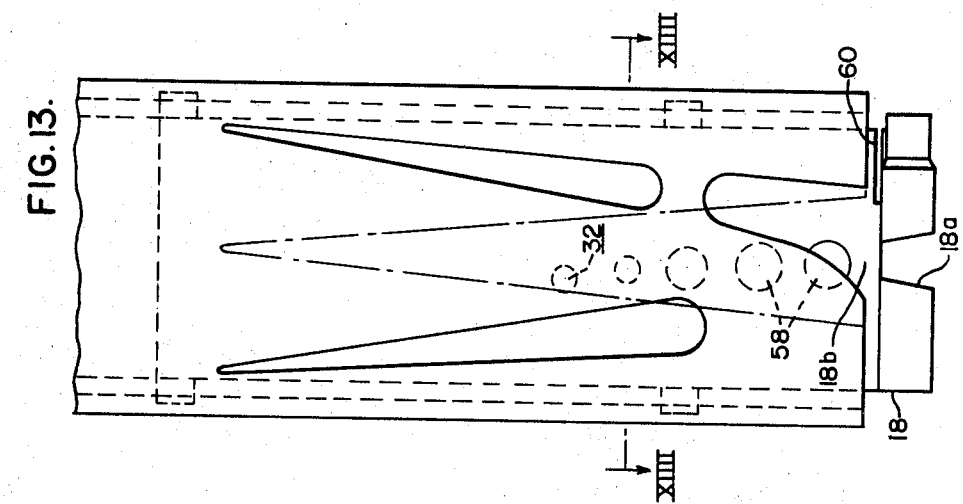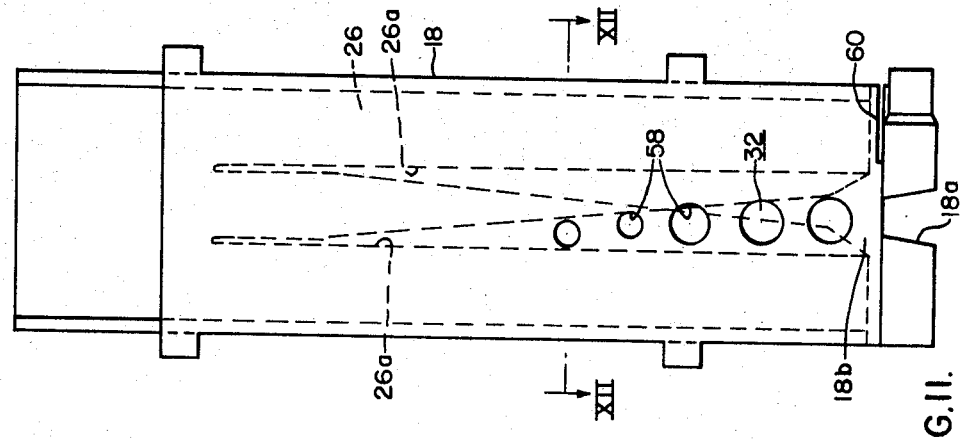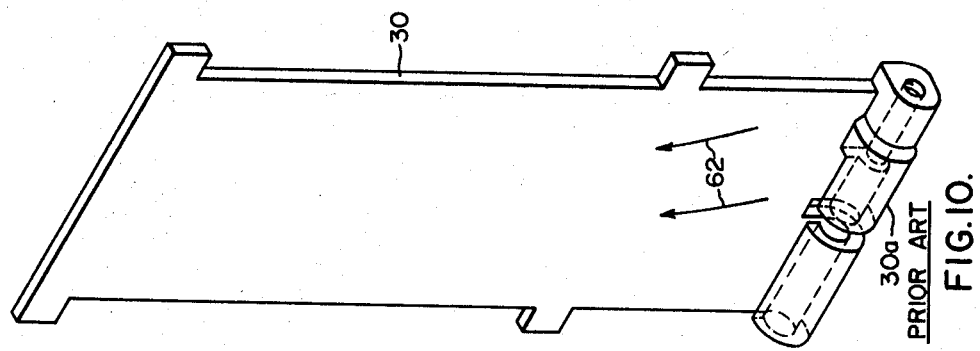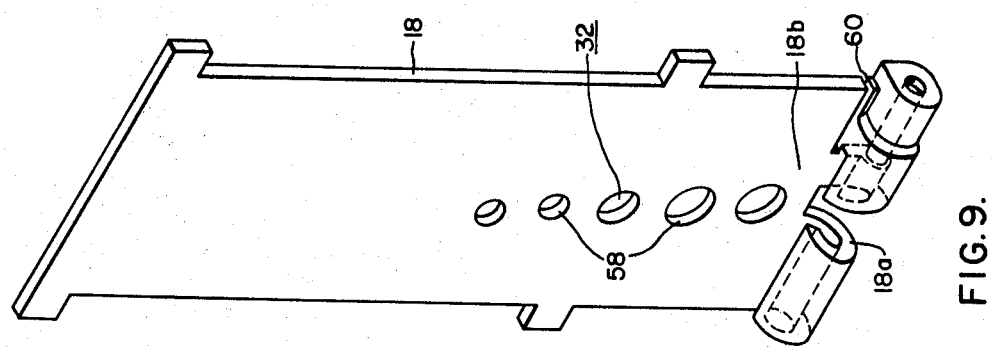

3,538,279
BLOWOUT MAGNET STRUCTURE FOR AIR-BREAK CIRCUIT INTERRUPTER
Samuel A. Bottonari, Pittsburgh, Pa., assignor to Westinghouse Electric Corporation, Pittsburgh, Pa., a corporation of Pennsylvania
Filed July 11, 1967, Ser. No. 652,526
Int. Cl. H01h 9/44, 33/18
U.S. Cl. 200—147                    8 Claims

ABSTRACT OF THE DISCLOSURE

An H-type magnetic blowout structure is provided for an air-break circuit interrupter including front and rear arcing horns and interrupting stacks interposed therebetween, with a pair of center arcing horns having connections to a pair of blowout coils. The two center arcing horns are provided with venting means comprising a plurality of spaced apertures, which lead into transfer stack interposed between the center arcing horns and the core of the magnet structure. Additionally, the center arcing horns have V-shaped lower arc entrance slots, and a horizontal cut providing a space at the coil-terminal connection to compel the transferred current to flow more effectively upwardly along the center arcing horns. Venting means is provided on the rear side of the two center arcing horns so that a preionization condition is provided in the main interrupting stacks to facilitate a favorable space break-down and upward movement of the two main body portions of the arc in these regions.

CROSS-REFERENCES TO RELATED APPLICATIONS

Applicant is unaware of any pending patent application which is related to the instant application.

BACKGROUND OF THE INVENTION

As is well known by those skilled in the art, it has been customary in H-type magnetic blowout structures to draw a main current arc, which is subdivided into two main arcing portions and an intervening transfer-arc portion, the latter being terminated at a pair of center arcing horns connected to blowout coils, so that upon interruption of the center transfer arcing portion, the current will be compelled to flow through the two blowout coils in series to set up a transverse magnetic field within the main interrupting stacks to facilitate upward movement of the two main arc portions therein. For effective operation it is necessary to quickly effect extinction of the center transfer arc portion, and to effect this end it has been customary to use a pair of transfer interrupting plates, preferably of a ceramic material, interposed between the two center arcing horns and the magnetic core. Difficulty has been encountered in effecting interruption of the center transfer arc portion, with the center transfer arc portion having its terminals tending to hang onto the center arcing horns, thereby causing metallic vaporization and sputtering with a consequent passage of metallic vapor into the region around the center arcing horns, which impedes fast arc extinction.

In the center arcing horns of the prior art, there was provided merely a small vertical arcing slot at the lower entrance portion of the center arcing horns, and the main body portion of the center arcing plates was solid, or continuous with no apertures provided therein. Also the coil-lead connection at the lower end of the center arcing plate was continuous, which meant that the current, transferred to the center arcing plates, would fan generally diagonally upwardly into the middle portion of the center arcing horn.

SUMMARY OF THE INVENTION

In accordance with a preferred embodiment of the invention, there is provided an H-type magnetic blowout structure for an air-break circuit interrupter utilizing a pair of center arcing plates, which have venting means associated therewith comprising a plurality of venting apertures extending upwardly along the arcing plate and leading into a venting passage rearwardly of the center arcing plates. Additionally, a lower V-shaped arc entrance slot is provided to facilitate entering of the main arc portion into and upwardly along the surface of the center arcing horn. Also, it has been found advantageous to provide a horizontal cut at the coil terminal, so as to more effectively direct the current flow into the center portion of the center arcing plate rather than permitting it to fan generally diagonally upwardly into the arcing plate.

A general object of the invention is to provide an improved H-type magnetic blowout structure for a circuit interrupter, particularly one of the air-break type, in which rapid interruption of the transfer arc portion is achieved, and a preionization condition is obtained in the main interrupting stacks by a venting of the transfer arcing gases from the transfer arc portion, so that the main arc portions are encouraged to move upwardly within the main interrupting stacks by this perionization condition.

Another object of the invention is to provide an improved center arcing horn of unique configuration, and having the current flow and the venting associated therewith improved for more effective transfer arc extinction.

Still a further object of the present invention is the provision of an improved air-break circuit interrupter of the magnetic H-type in which arc interruption is more rapidly achieved in less time by an improved extinction of the transfer arcing portion to thereby bring the blowout coils more rapidly into the series current path.

Further objects and advantages of the invention will more readily become apparent upon reading the following specification, taken in conjunction with the drawings.

BRIEF DESCRIPTION OF THE DRAWINGS

FIG. 9 is a perspective view of the improved center arcing plate or horn of the present invention;

FIG. 10 is a perspective view of a center arcing horn of the type used in the prior art;

FIG. 11 is a fragmentary enlarged assembled view of a portion of the transfer stack, taken substantially along the line XI—XI of FIG. 2;

FIG. 12 is a plan sectional view taken along the line XII—XII of FIG. 11;

FIG. 13 is a fragmentary enlarged assembled view of a portion of the main arc-extinguishing stacks, taken substantially along the line XIII—XIII of FIG. 12;

FIG. 14 is a plan sectional view taken along the line XIV—XIV of FIG. 13; and

Figure 2:
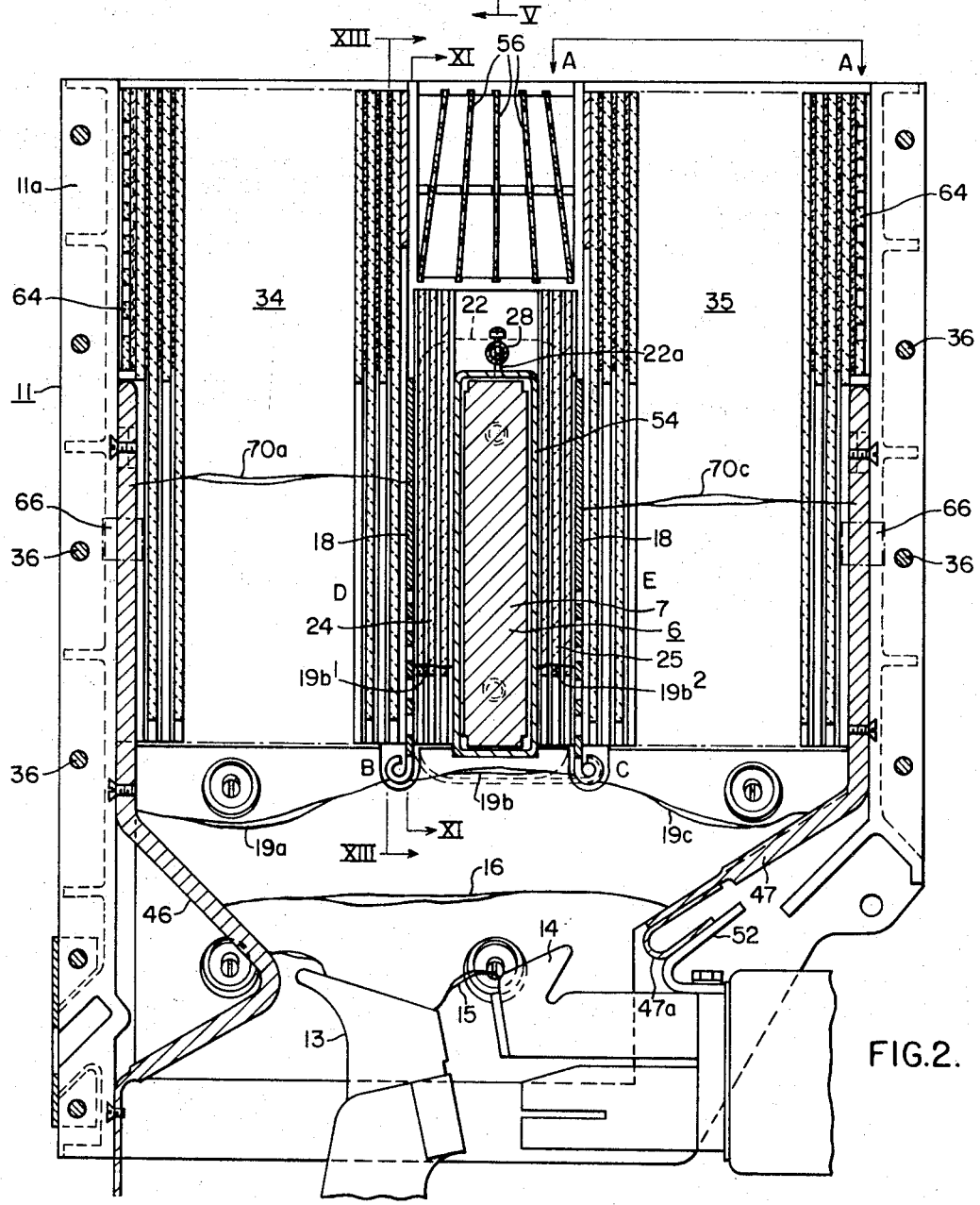
FIG. 2 is a vertical sectional view taken through a commercial-type of arc-chute structure embodying the present invention, the contact structure being shown in the partially open-circuit position, and the various arc portions being indicated.

FG. 15 is an exploded view, in perspective, of the portion of the arc-chute of FIG. 2 indicated by the portion A—A of FIG. 2.

DESCRIPTION OF THE PREFERRED EMBODIMENT

Figure 1:
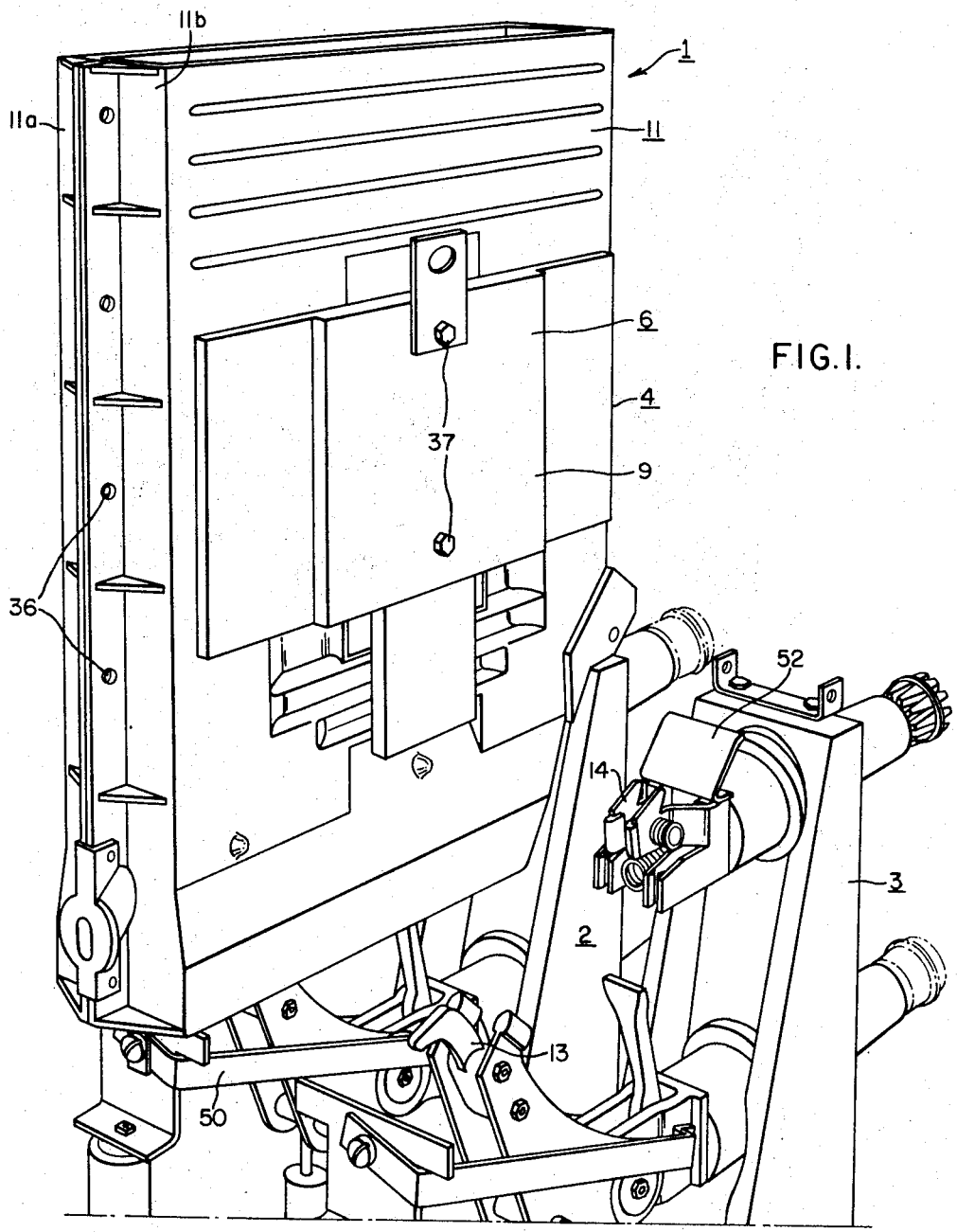
FIG. 1 is a perspective fragmentary view of a three-pole air-break circuit interrupter incorporating arc-chute structures of the type embodying the present invention, the contacts shown in the open position.

Referring to the drawings, and more particularly, to FIG. 1 thereof, the reference numeral 1 generally designates a three-pole air-break type of circuit interrupter generally comprising separable contact structure 2, insulating supporting means 3 therefor, and an arc-chute structure 4, only one of which is illustrated, and serving the purpose of quickly extinguishing the established arc and thereby effecting circuit interruption.

Figure 8:
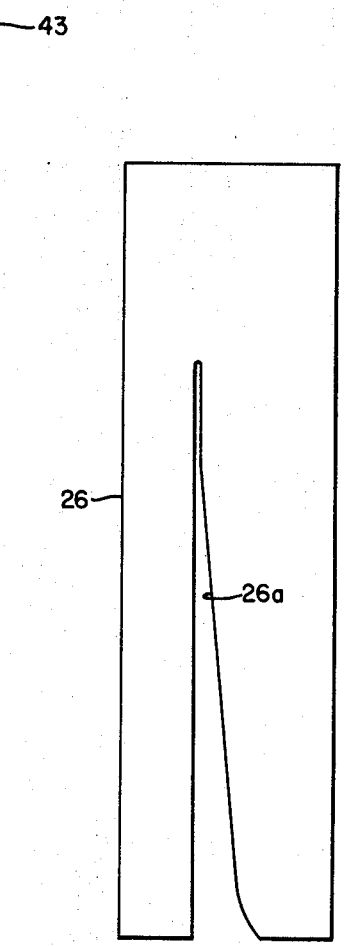
FIG. 8 is a side elevational view of one of the ceramic transfer plates.

FIG. 2 more clearly illustrates the general manner of arc interruption. It will be observed that there is provided a generally H-type magnetic blowout structure 6 comprising a central magnetic core 7 and abutting side magnetic pole plates 8, 9 supported by an arc-chute housing 11. As indicated in FIG. 2, the leftward opening movement of the movable contact 13 from the stationary contact 14 causes the establishment of a main arc indicated by the reference numeral 15. Due to the upward convection flow of air currents and the natural magnetic loop of the electrical circuit, the initial arcing portion 15 moves upwardly to the position designated by the reference numeral 16. Further upward movement causes the main arcing portion 16 to contact the two center arcing plates or horns 18 (FIG. 9), where the arc is thus divided into three arcing portions, as indicated by the reference numerals 19a, 19b and 19c. Generally, the manner of insertion of the two blowout coils 21, 22 (FIG. 5) into the circuit is achieved by the interruption of the transfer arc portion 19b at the two center arcing horns 18 by means of a pair of transfer stacks 24, 25 comprising a plurality of spaced slotted ceramic plates 26 (FIG. 8). The interruption of this arcing portion 19b will cause the electrical circuit to pass through the two main arcs 19a, 19c, and through the center arcing plates 18 and through the two blowout coils 21, 22, which have their other terminal ends 21a, 22a connected at the upper end of the stack by a terminal connector 28. The general manner of circuit interruption is set forth in detail in U.S. Pat. 2,889,433, issued June 2, 1959 to John M. Kozlovic and Russell E. Frink, and assigned to the assignee of the instant application.

Figure 15:
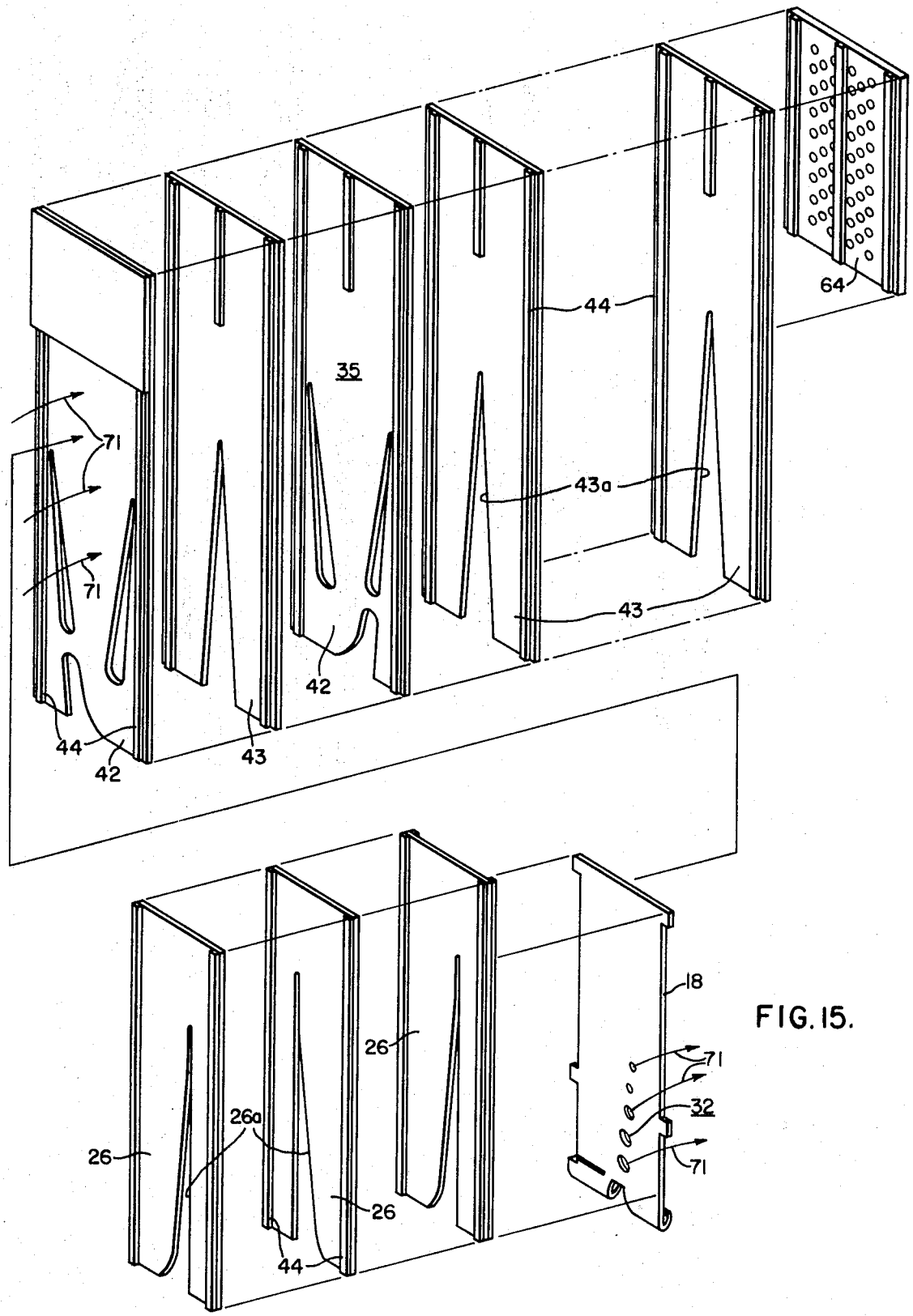

It is, of course, obvious that rapid interruption of the transfer arcing portion 19b is desirable. According to prior art center arcing plates 30, of the type illustrated in FIG. 10, considerable sputtering and 'hanging" on of the transfer arc terminals at the lower ends 30a of the center arcing horns 30 was encountered. By the novel use of an improved center arcing plate 18, as illustrated in FIGS. 9 and 15, and due to improved venting means 32 (FIG. 9), more fully described hereinafter, an increased speed of extinction of the transfer arcing portion 19b has been achieved. Additionally, and very importantly, there has been provided by such venting action 32 a preionization condition within the main interrupting stacks 34, 35 by the venting of ionized products of decomposition resulting from upward travel of the arcing portion 19b within the two transfer stacks 24, 25. This preionization condition, which has been obtained by the use of the improved center arcing horns 18, is advantageous inasmuch as it encourages upward travel of the two main arcing portions 19a, 19c into the main stacks 34 and 35.

Figure 3:
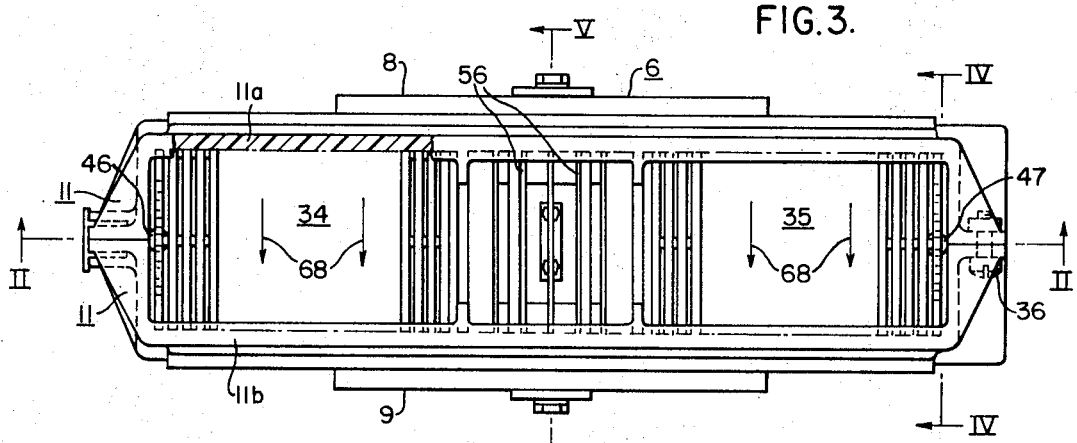
FIG. 3 is a top plan view of the arc-chute structure of FIG. 2.

With reference to FIGS. 1 and 3 of the drawings, it will be noted, generally, that the arc-chute structure 4 comprises a pair of mating molded side-plate housing sections 11a, 11b, which meet along their edges and are bolted together, as at 36. These two mating molded side arcing-plate housings 11a, 11b have recesses of suitable configuration provided therein to assist in locating the several parts of the interrupter. Each side section 11a or 11b has an opening 11c (FIG. 5) provided therein to accommodate the center magnet core 7, which has bolted to it, as at 37, the side magnetic pole plates 8, 9, as is more apparent from an inspection of FIGS. 1 and 5 of the drawings. Generally, the arrangement is such that a pair of arcing plates, or "fire plates" 39 is bolted to the lower inner sides of the side housing sections 11a, 11b. A pair of main interrupting sections 34, 35 comprising a plurality of spaced slotted ceramic plates 42, 43, having spacers 44 therebetween, are placed into position, and the front and rear arcing horns 46, 47, together with the center arcing horns 18, are arranged so that the front acing horn 46 is connected to the movable main contact 13 by a conducting strap 50 (FIG. 1). The rear arcing horn 47 has a disconnecting U-shaped portion 47a, which makes separable resilient engagement with a terminal portion 52 of the stationary contact structure 14.

A plurality of alternately reversed ceramic transfer arcing plates 26 having spacers 44 therebetween and spaced from the rear sides of the center arcing plates 18, is provided to facilitate interruption of the center transfer arcing portion 19b. These alternately arranged transfer plates 26 have a pair of diverging slots 26a provided therein to enable a zig-zag upward elongation of the transfer arcing portion 19b, which assists in its extinction. It will be apparent that the center transfer arcing portion 19b encounters the lower end of a loop-shaped shading coil 54 (FIG. 2), which surrounds the center magnet core 7 and has its outer terminals $19b^1$, $19b^2$ moving upwardly along the vented center arcing horns 18. Adjacent the upper end of the arc-chute structure 4 there are provided screening gas-cooling baffles 56, which assist in cooling the arcing gases and prevent external flashover.

By the provision of venting means 32, comprising a plurality of spaced apertures 58, in the center arcing plates 18, and by a V-shaped entrance portion 18a, provided at the lower end thereof, facilitated and rapid arc movement upwardly along the center arcing plates 18 has been achieved. Additionally, it has been found desirable, for more effective current flow, to provide a slot 60 obtained by a separate milling operation, for example, so that the arc current is compelled to flow into the lower center portion 18b (FIG. 9) of the arcing plates 18, rather than fanning generally diagonally upwardly into the center arcing plates, as indicated by the arrows 62, of the prior-art center plate 30 shown in FIG. 10.

Figure 4:
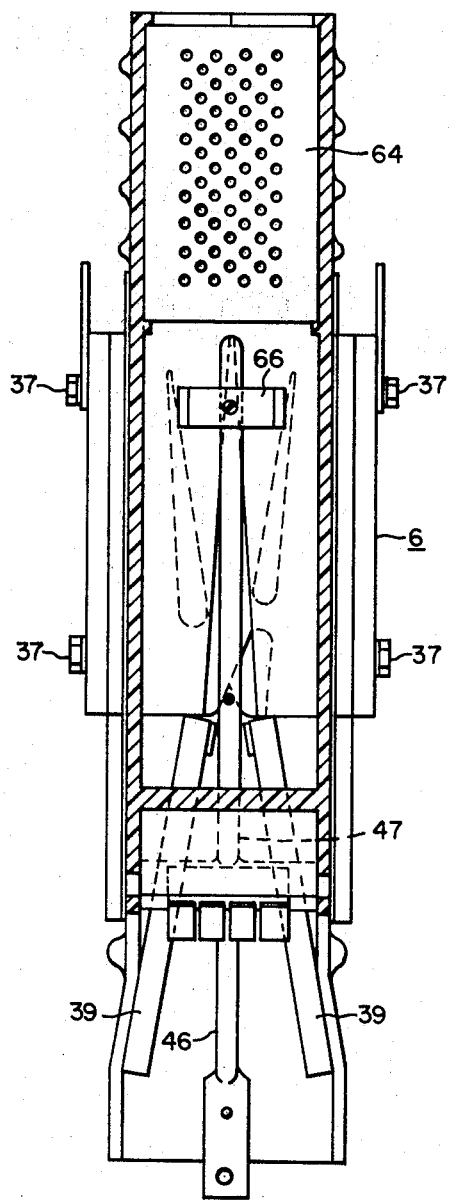
FIG. 4 is a vertical sectional view taken substantially along the line IV—IV of FIG. 3.
Figure 5:
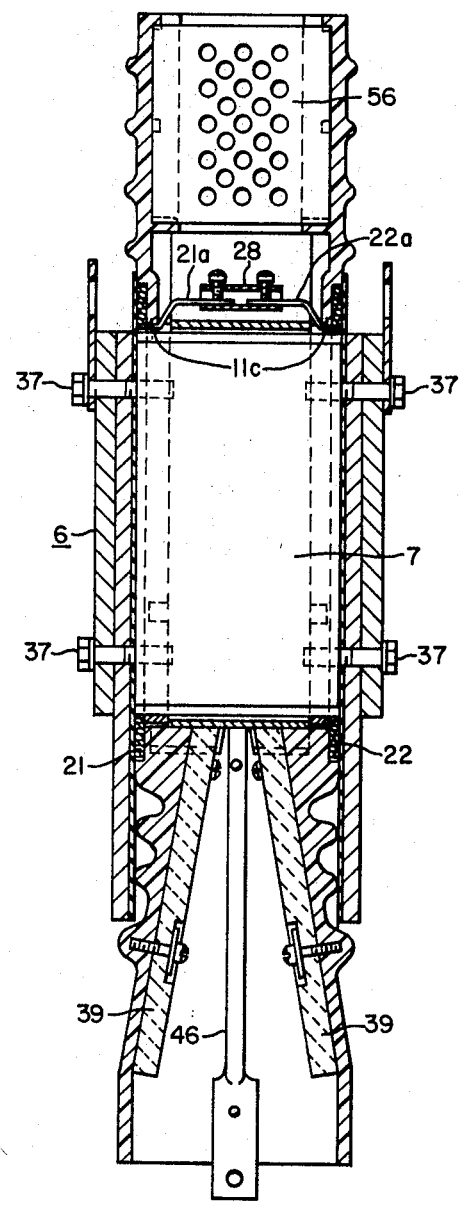
FIG. 5 is another vertical sectional view taken substantially along the line V—V of FIG. 3.
Figure 6:
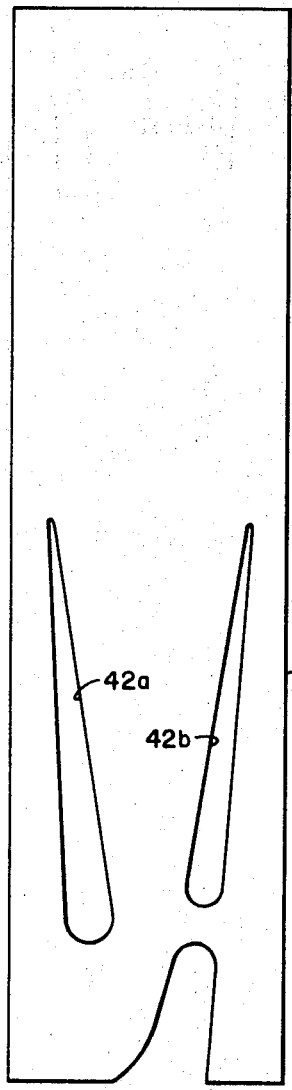
FIG. 6 is a side elevational view of one of the two types of ceramic plates used in the main arc-chute stack sections.
Figure 7:
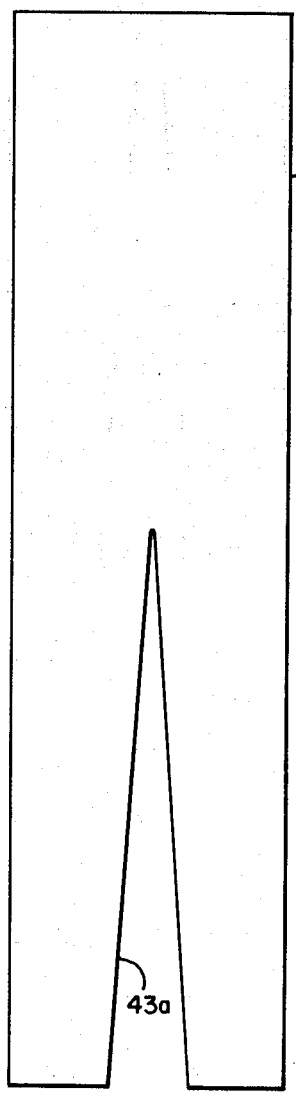
FIG. 7 is a side elevational view of the other type of ceramic plate used in the main arc-chute stack section.

FIGS. 4 and 5 illustrate vertical sectional views taken upwardly through the arc-chute structure 4 indicating the slotted configuration of the ceramic arcing plates 42, 43 and the perforated insulating baffle plate 64, provided at the upper ends of the rear and front arcing horns 46, 47. The front and rear arcing horns 46, 47 are provided by suitably-configured round bars having spring-positioning corona suppressors 66 bolted thereto to position them in a central location.

As was mentioned hereinbefore, generally the manner of arc interruption is the upward movement of the initially established arc 15 (FIG. 2) upwardly into engagement with the center arcing plates 18, at which location the transfer arcing portion 19b is subdivided further into two separate arcing portions $19b^1$, $19b^2$ moving on opposite sides of the shading coil 54, which surrounds the center magnet core 7. The two transfer arcing portions $19b^1$, $19b^2$, in moving upwardly within the zig-zag slots 26a of the transfer stacks 24, 25 becames interrupted; and the current flowing through the breaker 1 is forced to traverse the two blowout coils 21, 22, which are arranged in electrical series by a terminal connector 28 (FIG. 2) disposed adjacent the upper end of the arc chute 4. The energization of the two serially-related blowout coils 21, 22 causes a transverse magnetic field to be established within the main interrupting stacks, as indicated by the arrows 68 of FIG. 3, and the magnetic field acts upon the main arcing portions 19a, 19c to move them upwardly within the slotted ceramic plates 42, 43 comprising the main interrupting stacks 34, 35 to the positions 70a, 70c (FIG. 2). Additionally, this movement is facilitated by a preionization condition achieved by the venting of the transfer arcing portion $19b^1$, $19b^2$ through the venting means 32 provided by the center arcing plates 18. This condition is indicated by the arrows 71 in FIG. 15 of the drawings.

Generally, the present invention is particularly concerned with air-break magnetic circuit interrupters involving magnetic-field structures, which provide the necessary driving field for the arc. It has been discovered experimentally that arc-chutes incorporating the present invention materially benefit from the improvement in a manner to provide a more effective arc interruption. There results an easy and quick transfer of the arc current to the blowout coils 21, 22 as quickly as possible in the shortest time duration, which results in the necessary blowout field 68 (FIG. 3) to quickly act upon the established arc 19. Prior-art structures caused an impeded movement of the arcing terminals at the center arcing plates 30 (FIG. 10) with a resultant high spot temperature and considerable vaporization of metallic material from the prior-art center arcing horns 30. This, in turn, created high ionization, high vapor pressures; and both consequently tended to impede the upward arc movement with resulting relatively poor current transfer characteristics. The heavy cloud of vaporized metal materially reduced the deionization characteristics of the ceramic stacks, particularly in the vicinity indicated by the reference numerals B and C, so that dielectric recovery possible is reduced. The present invention has considerably reduced vapor and pressure conditions, thus increasing the interrupting performance of the circuit breaker 1 as a whole with less external demonstration, and providing also increased interrupting capacity of a given structure. As a matter of fact, two successful ratings of a given structure 1 resulted from an incorporation of the modification 18 of the present invention.

Arc-chutes not having these modifications have shown the center arcing horns 30 (FIG. 10) to cause considerable metallic erosion at the points B and C (FIG. 2) with consequent relative ineffective use of ceramic plates in the vicinity of reference numerals B and C (FIG. 2).

The incorporation of the invention has resulted in the following particular advantages: the arcing terminals at 18a have increased transfer mobility rate enhancing fast transferring of the arc current to the blowout coils 21, 22. There is provided cleaner and faster cut-in of the blowout coils 21, 22, and hence quicker magnetic field buildup 68. Additionally, there is a reduction of local gas and vapor pressure impedance to upward movement of the arc, resulting in increased arc mobility. The interrupting capacity has been increased with a resultant longer arc-chute life due to less metallic contamination condensing on the ceramic stacks 34, 35.

Upon contact separation, an arc is drawn which first intercepts the arcing terminals, and while the arc persists until the total current is shunted to the coils 21, 22, the arc products can vent easily outwardly into the openings 58 of the center arc horn vents, as indicated by the arrows 71 of FIG. 15. These are provided, and the arc gases being highly ionized, vent into the extended arcing regions D and E (FIG. 2). Indications from previous tests shows a rather sputtering type of arc-length development, this being usually associated with a too rapid dielectric recovery, or "starvation" of the arc not maintaining a consistently expanding arc mechanism for a stable arc condition. The dual venting properties 32 of the new arcing horns 18 facilitates this proper mechanism by "dumping" the original ionization products during the blowout coil cut-in into the next logical main arc formation regions D and E. This encourages a subsequent transfer of the main arcing portions 19a, 19c upwardly into the main stacks 34, 35.

From the foregoing description, it will be apparent that there has been provided an improved magnetic blowout structure of the H-type resulting from an improved configuration and arrangement of the center arcing horns 18 with improved venting means 32 associated therewith.

Although there has been illustrated and described a specific structure, it is to be clearly understood that the same was merely for the purpose of illustration, and that changes and modifications may readily be made therein by those skilled in the art without departing from the spirit and scope of the invention.

I claim as my invention:

1. A circuit breaker including separable contact means for establishing a main current arc, an H-type magnet structure with a central magnetic core magnetically interconnecting two magnetic pole plates, coil means encircling said central magnetic core having end terminals, a center metallic arcing plate connected to each end terminal, main arc-chute sections disposed on opposite sides of the two center arcing plates for interrupting the two arc portions following coil insertion into the electrical circuit, and at least one of said center arcing plates having venting means disposed in the central body portion thereof for venting of the arc gases into the main arc-chute sections.

2. The combination of claim 1, wherein each center arcing plate has a V-shape arc entrance notch provided therein.

3. The combination of claim 1, wherein each center arcing plate has a generally horizontal slot provided therein to positively feed the arc current into the central portion of the plate.

4. The combination of claim 1, wherein spaced insulating plate sections are provided on opposite sides of each center metallic arcing plate.

5. The combination of claim 1, wherein said one center arcing plate has the venting means in substantial alignment with cut-out portions of adjoining plate means for facilitated venting of the arc gases.

6. A circuit breaker of the air-break type including means defining an H-type magnet structure, separable contact means for establishing an arc, slotted insulating spaced-plate portions disposed between the bight portions of the H-shaped magnet structure, a pair of transfer plate sections and a pair of center arcing plates on opposite sides of the central magnet core of the H-type magnet structure, blowout coil means electrically connected to said pair of center arcing plates, the transverse magnetic field moving arc portions up into the slots of the spaced-plate portions following blowout coil insertion, and each center arcing plate having venting means associated therewith comprising spaced apertures provided in the central body portion thereof.

7. The combination of claim 6, wherein each center arcing plate has a V-shape arc entrance slot at the lower end thereof.

8. The combination of claim 6, wherein each center arcing plate has a horizontal slot therein to direct the arc current into the center portion of the plate.

References Cited
UNITED STATES PATENTS

| 2,769,065 | 10/1956 | Frink | 200—147 |
| 2,821,606 | 1/1968 | Mikos et al. | 200—147 |
| 2,889,433 | 6/1959 | Kozlovic et al. | 200—147 |

ROBERT S. MACON, Primary Examiner

U.S. Cl. X.R.

200—144